United States Patent [19]

Anderson

[11] Patent Number: 5,052,544

[45] Date of Patent: Oct. 1, 1991

[54] TRAY LOADING MACHINE

[75] Inventor: David L. Anderson, Alexandria, Minn.

[73] Assignee: APV Douglas Machine Corporation, Alexandria, Minn.

[21] Appl. No.: 460,281

[22] Filed: Dec. 29, 1989

[51] Int. Cl.$^5$ ............................................. B65G 47/26
[52] U.S. Cl. .................................. 198/456; 198/457; 198/474.1; 198/732; 53/251; 53/252
[58] Field of Search ............... 198/456, 457, 598, 732, 198/474.1; 53/251, 252

[56] References Cited

U.S. PATENT DOCUMENTS

| | | | |
|---|---|---|---|
| 2,561,541 | 7/1951 | Stake | 198/456 |
| 3,282,585 | 11/1966 | Dieter | 53/251 |
| 3,453,800 | 7/1969 | Mahncke | 53/252 |
| 3,845,852 | 11/1974 | Langen et al. | 198/732 |
| 3,900,096 | 8/1975 | Nack et al. | 198/457 |
| 4,380,283 | 4/1983 | Van Maanen | 198/456 |
| 4,804,076 | 2/1989 | Pace | 198/456 |

Primary Examiner—Joseph E. Valenza
Attorney, Agent, or Firm—Peterson, Wicks, Nemer & Kamrath

[57] ABSTRACT

A machine (10) for loading product onto trays or the like is shown in the preferred embodiment including paddles (16) pivotally mounted to spaced, horizontally arranged chains (30) located above the conveyor (12). A cam track (46) arranged above the chains (30) is engaged by cam followers (48) mounted on the paddles (16). The chains (30) are mounted at an angle relative to the conveyor (12). The paddles (16) are moved by the chains (30) to move longitudinally at the same speed as the product on the conveyor (12) while being held parallel to the movement direction of the conveyor (12) by the followers (48) engaging the cam track (46) to thus simultaneously move laterally across the conveyor (12) to push product located intermediate lugs (14) on the conveyor (12).

18 Claims, 1 Drawing Sheet

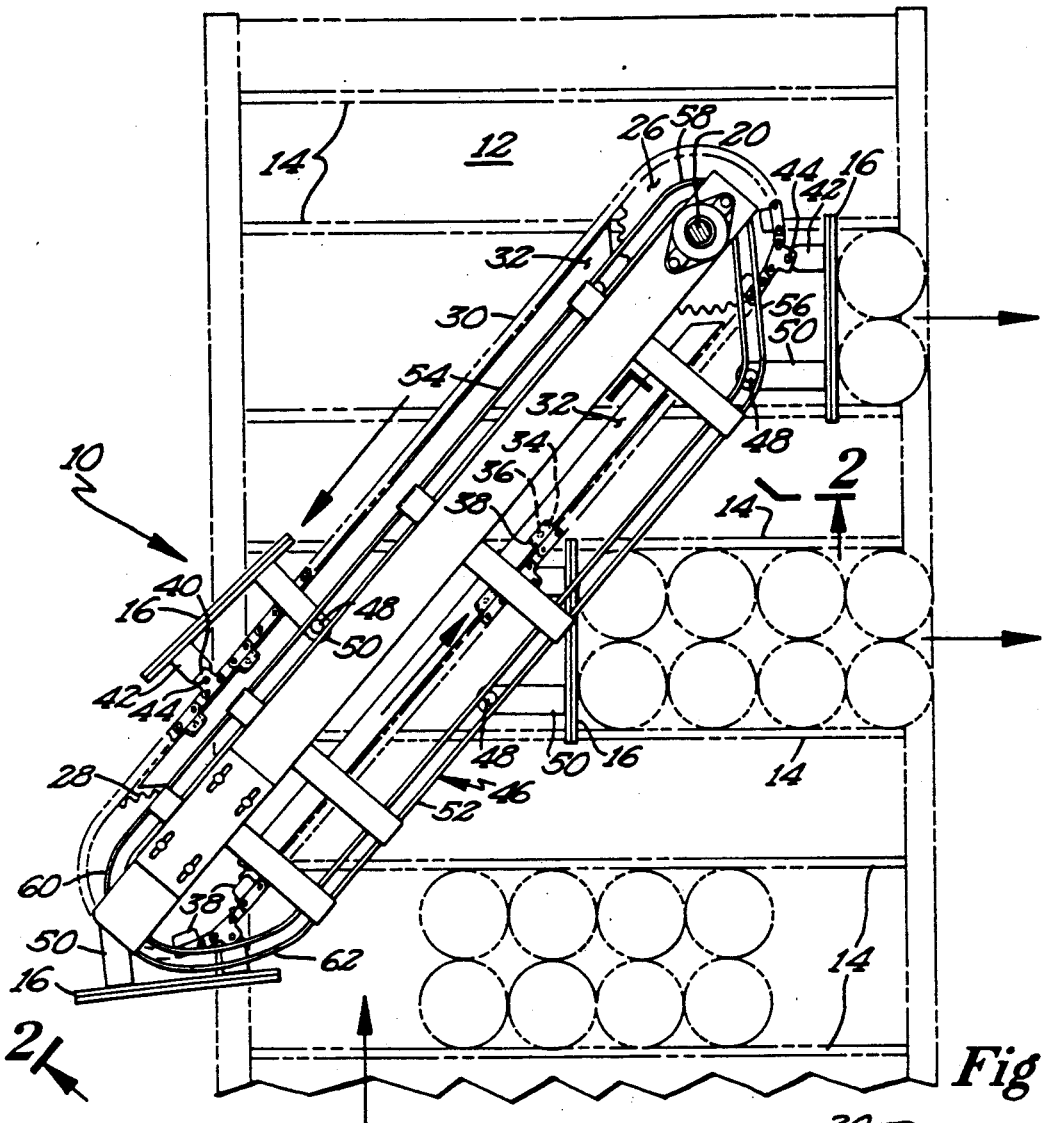
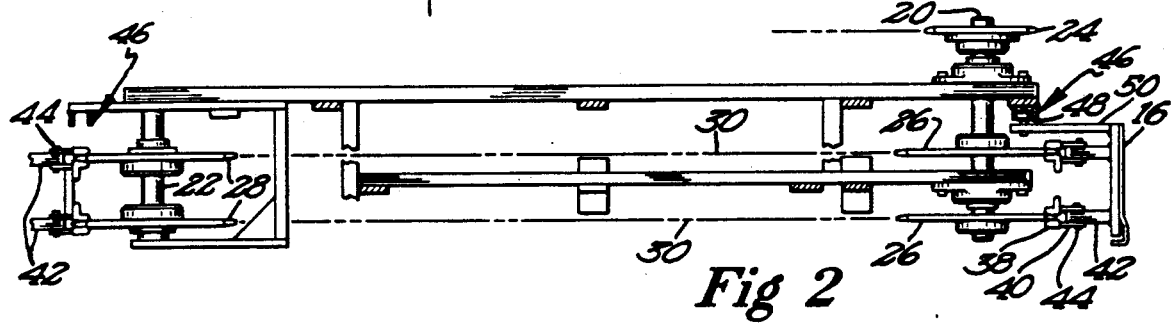
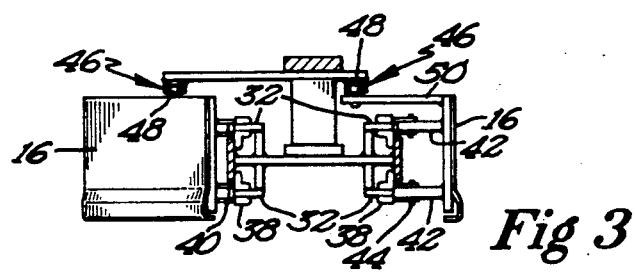

TRAY LOADING MACHINE

BACKGROUND

The present invention generally relates to machines for pushing product laterally on a conveyor, and particularly in the preferred form to tray loading machines.

In a typical packaging operation, products are designed to be placed in cartons or trays which are then sealed or closed such as by shrink wrap for shipping. A common way for placing the product into the container is that the container is at least partially set up at the same level and along side of the accumulated and arranged product. The product is then pushed into the partially formed container by some mechanical method. Prior approaches for mechanically pushing the product suffered from several disadvantages and deficiencies. Specifically, prior loading machines were of complicated design, were expensive to manufacture and maintain, took considerable floor space both in machine width and length, were generally difficult to adapt to different size products, were unable to load products which were tied in packs, were unable to maintain the products in a pack arrangement, or were otherwise deficient.

Thus, a need has arisen in at least the field of tray loading machines for a method of mechanically pushing product laterally which overcomes the disadvantages and deficiencies of prior tray loading machines.

SUMMARY

The present invention solves this need and other problems in the area of product packaging by providing, in the preferred form, a pivotally mounted paddle which is moved along a circuitous path above the product conveyor and which is pivoted relative to the circuitous path generally perpendicular to laterally extending, spaced lugs to push the product intermediate the lugs as the paddle moves along the circuitous path.

It is thus an object of the present invention to provide a novel machine for mechanically pushing product.

It is further an object of the present invention to provide such a novel machine for loading product into trays or the like.

It is further an object of the present invention to provide such a novel machine which is of a simple design inexpensive to manufacture and maintain.

It is further an object of the present invention to provide such a novel machine requiring minimal floor space.

It is further an object of the present invention to provide such a novel machine easily adaptable to different size products.

It is further an object of the present invention to provide such a novel machine able to push product tied in packs.

It is further an object of the present invention to provide such a novel machine which pushes the product straight laterally and not at an angle.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a top plan view of a tray loading machine according to the preferred teachings of the present invention.

FIG. 2 shows a sectional view of the tray loading machine of FIG. 1 according to section line 2—2 of FIG. 1.

FIG. 3 shows a sectional view of the tray loading machine of FIG. 1 according to section line 3—3 of FIG. 2.

All Figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "vertical", "horizontal", "side", "end", "longitudinally", "lateral", "side", "end", "inward", "outward", "front", "rear", "other", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A tray loading machine according to the preferred teachings of the present invention is shown in the drawings and generally designated 10. Machine 10 is associated with a conveyor 12 which may be located adjacent to a tray forming machine or other packaging machine or the like. Conveyor 12 includes a series of spaced, upstanding, front and rear, laterally extending lugs 14 for slideably receiving and containing the product to be loaded. Generally, machine 10 includes a plurality of pusher plates or paddles 16 which move longitudinally at the same rate as conveyor 12 and simultaneously move laterally across conveyor 12 to push product laterally from conveyor 12 and into trays or the like being formed in the tray forming machine.

Machine 10 further includes unique and advantageous provisions for moving paddles 16 relative to conveyor 12. Specifically, first and second vertical shafts 20 and 22 are provided rotatably supported above conveyor 12, with at least one of shafts 20 being driven such as by a sprocket 24. First and second sprockets 26 and 28 are rotatably fixed in a spaced relation on shafts 20 and 22. Elongated flaccid members shown as roller chains 30 are provided to extend around sprockets 26 and 28 of shafts 20 and 22 in parallel, spaced, horizontal, circuitous paths.

Chains 30 are stabilized between sprockets 26 and 28 in the most preferred form in a manner as disclosed in U.S. Pat. No. 4,810,238 which is hereby incorporated by reference. Specifically, first and second chain rails 32 are provided on opposite sides of a line extending through shafts 20 and 22, parallel to each other, tangential to sprockets 26 and 28, and intermediate sprockets 26 and 28. Roller chain 30 includes spaced links having first and second, spaced, parallel, inwardly extending attachment tabs 34 including holes 36 formed therein. Chain guides 38 formed of low sliding friction material are securely held on attachment tabs 34 and slideably abut on both faces of chain rails 32 intermediate sprockets 26 and 28.

In the most preferred form, shafts 20 and 22 are positioned at laterally different positions such that chain 30 extends at an acute angle in the order of 50° laterally across conveyor 12.

Paddles 16 are pivotally mounted to the outer surface of chains 30 for movement along the circuitous path of chains 30 above conveyor 12. In the preferred form, chains 30 include spaced links having first and second, spaced, parallel, outwardly extending attachment tabs 40. First and second, spaced, parrallel, inwardly extending ears 42 are provided on paddles 16 for receipt intermediate tabs 40 of first and second chains 30. Ears 42 are pivotally attached to tabs 40 such as by pivot pins 44.

Machine 10 further includes provisions for pivoting the paddles 16 relative to chains 30 such that paddles 16 move longitudinally with conveyor 12 generally parallel to the movement direction of conveyor 12, laterally across conveyor 12, and generally perpendicular to lugs 14. Specifically, in the preferred form, a cam track 46 is provided adjacent to chains 30. A cam follower 48 is provided on the free end of an inwardly extending tab 50 provided on paddle 16. Particularly, cam track 46 is formed by spaced, continuous members between which follower 48 is slideably captured. Tab 50 in the preferred form has a length which is a multiple of the length of ears 42 and is located in a spaced, parallel, relation from ears 42, with ears 42 located adjacent the front of paddle 16 and tab 50 locate adjacent the rear of paddle 16. The infeed side 52 of cam track 46 is located outside of and generally parallel to rails 32 and chains 30. It can then be appreciated that due to the preferred relation of tab 50 and ears 42 and of track 46 relative to chains 30, paddles 16 will be held at an angle relative to chain 30 and longitudinal and generally parallel to the movement direction of conveyor 12. The downstream side 54 of cam track 46 is located inside of and generally parallel to rails 32 and chains 30. It can then be appreciated that due to the preferred relation of tab 50 and ears 42 and of track 46 relative to chains 30, paddles 16 will be held generally parallel to chain 30 and across conveyor 12. Side 52 is connected to side 54 on the downstream end of track 46 by a first, straight end portion 56 extending at an angle of 45° from side 52 towards side 54 and by a second, arcuate end portion 58 which interconnects end portion 56 with side 54. It can then be appreciated that portion 56 extends at a slight angle to the movement direction of conveyor 12. The relationship of chains 30 going around sprockets 26 and of end portion 56 insures that the rear of paddle 16 does not engage product located in the tray forming machine when paddle 16 goes around sprockets 26 and from side 52 to side 54. The upstream end of side 54 of track 46 is connected to a third, arcuate end portion 60 in turn connected to a fourth, arcuate end portion 62 in turn connected to the upstream end of side 52 of track 46. The radius of portion 62 is substantially larger than that of portion 60. The relationship of chains 30 going around sprockets 28 and of end protion 62 rapidly brings paddles 16 into a longitudinal position relative to conveyor 12.

In operation, product is placed on conveyor 12 such as by a container metering device, one type of which is disclosed in U.S. Pat. No. 4,832,178, with the product in a pack pattern located intermediate front and rear lugs 14. After traveling around sprockets 28, paddle 16 is positioned to extend between front and rear lugs 14 and travels in a forward, longitudinal direction to match that of lugs 14 and conveyor 12. Simultaneously, paddle 16 travels laterally across conveyor 12 in a direction generally parallel to lugs 14. Product will then be pushed laterally across conveyor 12 intermediate lugs 14 by paddle 16 unto a tray located on the parallel conveyor of a tray forming machine and which is traveling at the same speed as conveyor 12. Paddle 16 moves along portion 56 such that sufficient space exists between the product now located in the tray forming machine to allow paddle 16 to turn around sprockets 26. It can then be appreciated that a multiple of paddles 16 are provided on chains 30 corresponding to the spacing between lugs 14 of conveyor 12.

Now that the basic construction and operation of machine 10 according to the preferred teachings of the present invention have been explained, the subtle features and advantages of the present invention can be set forth and appreciated. Prior to the present invention, one approach utilized to load trays was the barrel cam loader which included slides located intermediate the lugs of the conveyor which were moved laterally by a cam mechanism. Another approach utilized to load trays was a belt angled across the conveyor. Barrel cam loaders required a large number of parts which are expensive to fabricate, assemble, and maintain and are of a large size requiring substantial floor space both in width and length. Although angled belt loaders were less complicated in design and were of a smaller size than barrel cam loaders, problems arise from pushing the products in the pack pattern at an angle. Specifically, products which are tied together such as in a six pack arrangement could not be loaded with angled belt loaders due to the stress placed on the tying structure when the tied product engaged and was pushed by the belt. Further, the angle of the belt in angled belt loaders could not be sharp to avoid the product from leaving the pack pattern intermediate the lugs of the conveyor when the product engaged the belt. Thus, although shorter than barrel cam loaders, shortening of angled belt loaders was restricted due to the angle required.

It can then be immediately appreciated that paddles 16 of machine 10 according to the teachings of the present invention push along a straight line laterally across conveyor 12 in a manner similar to barrel cam loaders to avoid the canting problems of prior angled belt loaders. Thus, machine 10 is able to load product tied together such as in a six pack arrangement and does not encounter pack pattern break up problems encountered in angled belt loaders. Thus, the angle of chains 30 and of machine 10 can be much sharper than in angled belt loaders, and thus the overall length of machine 10 according to the teachings of the present invention can be reduced from that of angled belt loaders.

Further, in addition to being of a considerably smaller size in both length and width than barrel cam loaders, machine 10 according to the preferred teachings of the present invention is further advantageous over barrel cam loaders at least due to the reduction in the number and complexity of parts, thus reducing the costs of fabrication, assembly, and maintenance. Further, machine 10 according to the teachings of the present invention is more adaptable to different sized products. Specifically, it can be appreciated that the spacing between lugs 14 must be varied according to the size of the particular product being loaded. As the slides of barrel cam loaders utilized the lugs as a guide, it is necessary to change slide sizes for every spacing of lugs 14. The size of paddles 16 of the present invention is not dependent upon the spacing of lugs 14 and may be located above lugs 14. Thus, paddles 16 can be made of a length generally equal to but preferrably exceeding the spacing of lugs 14 to extend past front and rear lugs 14 of conveyor 12 for the range of potential spacings of lugs 14 for which machine 10 may be utilized.

Now that the basic teachings of the present invention have been explained, many extensions and variations will be obvious to one having ordinary skill in the art. Although first and second chains 30 are utilized in the most preferred form to move paddles 16 around a circuitous path above conveyor 12, other types and forms of provisions may be provided to do so. For example, although two chains 30 are provided to pivotably support paddles 16, a single chain 30 may be utilized.

Similarly, although cam track 46 and cam follower 48 are utilized in the most preferred form to pivot paddles 16 relative to the circuitous path of chains 30, other types and forms of provisions may be provided to do so.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Machine for pushing product in a pack pattern laterally on a longitudinally moving conveyor, with the conveyor including spaced, laterally extending lugs for slideable receipt of the product in the pack pattern therebetween, comprising, in combination: at least a first paddle of an elongated length and having a front and a rear, with the elongated length of the paddle being at least generally equal to the longitudinal width of the pack pattern of the product and the spacing between the lugs of the conveyor; first and second sprockets rotatably mounted about spaced, parallel axes; an elongated flaccid member extending around the first and second sprockets and arranged along a circuitous, elongated path substantially positioned above the conveyor, with the paddle being pivotably mounted to the elongated flaccid member about a pivot axis; and means extending along the circuitous path of the elongated flaccid member substantially positioned above the conveyor for pivoting the paddle relative to the elongated flaccid member and generally perpendicular to the laterally extending lugs and parallel to the conveyor to push the products intermediate the lugs as the paddle moves along the circuitous path.

2. The machine of claim 1 wherein the pivoting means comprises means secured to the rear of the paddle spaced from the pivot axis for moving the rear of the paddle relative to the elongated flaccid member.

3. The machine of claim 2 wherein the pivoting means comprises, in combination: a cam track located adjacent to the elongated flaccid member; and a cam follower mounted to the rear of the paddle spaced from the pivot axis for camming upon the cam track.

4. The machine of claim 3 wherein the cam track includes a generally straight infeed side extending at an angle across the conveyor.

5. The machine of claim 4 wherein the cam track includes a downstream end having a first, generally straight end portion extending at an angle to the infeed side of the cam track to space the paddle from the produce of the conveyor.

6. Machine for pushing product laterally on a conveyor, with the conveyor including spaced, laterally extending lugs for slideable receipt of the product therebetween, comprising, in combination: at least a first paddle; means for moving the paddle along a circuitous path above the conveyor, with the paddle being pivotably mounted to the circuitous path moving means; a cam track located adjacent to the circuitous path moving means; and a cam follower mounted to the paddle for caming upon the cam track for pivoting the paddle relative to the circuitous path moving means and generally perpendicular to the lugs to push the products intermediate the lugs as the paddle moves along the circuitous path, wherein the cam track includes a generally straight infeed side extending at an angle across the conveyor, wherein the cam track also includes a downstream end having a first, generally straight end portion extending at an angle to the infeed side of the cam track to space the paddle from the product on the conveyor, and wherein the cam track further includes an upstream end having a generally arcuate end portion to rapidly bring the paddle into position generally perpendicular to the lugs as the paddle enters the infeed side of the cam track.

7. The machine of claim 6 wherein the cam track comprises, in combination: first and second, spaced, continuous members between which the cam follower is slideably captured.

8. The machine of claim 6 wherein the moving means comprises, in combination: first and second sprockets rotatably mounted about spaced, parallel axes; and an elongated flaccid member extending around the first and second sprockets.

9. The machine of claim 8 further comprising, in combination: means for stabilizing the flaccid member between the first and second sprockets.

10. The machine of claim 9 wherein the stabilizing means comprises, in combination: a rail extending tangentially between the sprockets; first and second tabs extending inwardly from the flaccid member, with the first and second tabs being in a parallel relation spaced for slideable receipt on the opposite faces of the rail.

11. The machine of claim 10 wherein the stabilizing means further comprises, in combination: guides secured to the tabs formed of low sliding friction material.

12. The machine of claim 8 wherein the paddle generally perpendicular to the laterally extending lugs has a longitudinal length generally equal to or exceeding the spacing between the lugs.

13. Machine for pushing product laterally on a longitudinally moving conveyor, with the conveyor including spaced, laterally extending lugs for slideable receipt of the product therebetween, comprising, in combination: at least a first paddle of an elongated length and having a front and a rear; first and second sprockets rotatably mounted above spaced, parallel axes; an elongated flaccid member extending around the first and second sprockets and arranged along a circuitous path above the conveyor, with the paddle being pivotably mounted to the elongated flaccid member about a pivot axis; means for pivoting the paddle relative to the elongated flaccid member and generally perpendicular to the laterally extending lugs and parallel to the conveyor to push the products intermediate the lugs as the paddle moves along the circuitous path; a rail extending tangentially between the sprockets; and first and second tabs extending inwardly from the flaccid member, with the first and second tabs being in a parallel relation spaced for slideable receipt on the opposite faces of the rail for stabilizing the flaccid member between the first and second sprockets.

14. The machine of claim 1 wherein the pivoting means comprises, in combination: a cam track located adjacent to the elongated flaccid member; and a cam follower mounted to the rear of the paddle spaced from the pivot axis for camming upon the cam track.

15. The machine of claim 1 wherein the paddle generally perpendicular to the laterally extending lugs has a longitudinal length exceeding the spacing between the lugs.

16. The machine of claim 3 wherein the cam track comprises, in combination: first and second, spaced, continuous members between which the cam follower is slideably captured.

17. The machine of claim 3 wherein the cam track includes an upstream end having a generally arcuate end portion to rapidly bring the paddle into position generally perpendicular to the lugs as the paddle enters the infeed side of the cam track.

18. The machine of claim 13 further comprising, in combination: guides secured to the tabs and formed of low sliding friction material.

* * * * *

UNITED STATES PATENT AND TRADEMARK OFFICE
CERTIFICATE OF CORRECTION

PATENT NO. : 5,052,544
DATED : October 1, 1991
INVENTOR(S) : David L. Anderson

It is certified that error appears in the above-identified patent and that said Letters Patent is hereby corrected as shown below:

Column 6, line 8, cancel "duce" and substitute therefor --duct--.

Column 6, line 18, cancel "caming" and substitute therefor --camming--.

Column 6, line 64, cancel "above" and substitute therefor --about--.

Signed and Sealed this

Second Day of November, 1993

Attest:

BRUCE LEHMAN

Attesting Officer

Commissioner of Patents and Trademarks